(12) United States Patent
Kurimoto

(10) Patent No.: US 12,191,091 B2
(45) Date of Patent: Jan. 7, 2025

(54) SOLID ELECTROLYTIC CAPACITOR ELEMENT AND SOLID ELECTROLYTIC CAPACITOR

(71) Applicant: Panasonic Intellectual Property Management Co., Ltd., Osaka (JP)

(72) Inventor: Takuya Kurimoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 246 days.

(21) Appl. No.: 17/999,558

(22) PCT Filed: Jun. 16, 2021

(86) PCT No.: PCT/JP2021/022956
§ 371 (c)(1),
(2) Date: Nov. 21, 2022

(87) PCT Pub. No.: WO2021/261359
PCT Pub. Date: Dec. 30, 2021

(65) Prior Publication Data
US 2023/0197355 A1 Jun. 22, 2023

(30) Foreign Application Priority Data
Jun. 22, 2020 (JP) .................. 2020-107156

(51) Int. Cl.
*H01G 9/042* (2006.01)
*H01G 9/15* (2006.01)

(52) U.S. Cl.
CPC ............. *H01G 9/0425* (2013.01); *H01G 9/15* (2013.01)

(58) Field of Classification Search
CPC .............................. H01G 9/0425; H01G 9/15
See application file for complete search history.

(56) References Cited

U.S. PATENT DOCUMENTS

| | | | | |
|---|---|---|---|---|
| 4,269,674 A | * | 5/1981 | Osa | ........................... C25B 3/27 205/459 |
| 2002/0008957 A1 | | 1/2002 | Tadanobu et al. | |

(Continued)

FOREIGN PATENT DOCUMENTS

| | | | | |
|---|---|---|---|---|
| CN | 105869920 A | * | 8/2016 | |
| CN | 110120304 A | * | 8/2019 | ............. H01G 11/24 |

(Continued)

OTHER PUBLICATIONS

International Search Report of PCT application No. PCT/JP2021/022956 dated Sep. 7, 2021.

*Primary Examiner* — Michael P McFadden
(74) *Attorney, Agent, or Firm* — Rimon P.C.

(57) ABSTRACT

A solid electrolytic capacitor element includes an anode body, a dielectric layer disposed on a surface of the anode body, a solid electrolyte layer covering at least a part of the dielectric layer, and a cathode lead-out layer covering at least a part of the solid electrolyte layer. The cathode lead-out layer includes a carbon layer that is in contact with the solid electrolyte layer and covers at least a part of the solid electrolyte layer. The carbon layer includes a carbonaceous material and a cyclodextrin compound. The cyclodextrin compound has a concentration of a saturated aqueous solution at 25° C. of 1.5 mass % or more.

7 Claims, 1 Drawing Sheet

(56) References Cited

U.S. PATENT DOCUMENTS

2009/0195966 A1    8/2009   Ozawa
2011/0149477 A1    6/2011   Summey et al.

FOREIGN PATENT DOCUMENTS

| JP | 2001-284182 | | 10/2001 |
| --- | --- | --- | --- |
| JP | 2008-027998 | | 2/2008 |
| JP | 2011216610 A | * | 10/2011 |
| JP | 2012-234922 | | 11/2012 |
| JP | 2013-515381 | | 5/2013 |
| JP | 2019-022878 | | 2/2019 |

* cited by examiner

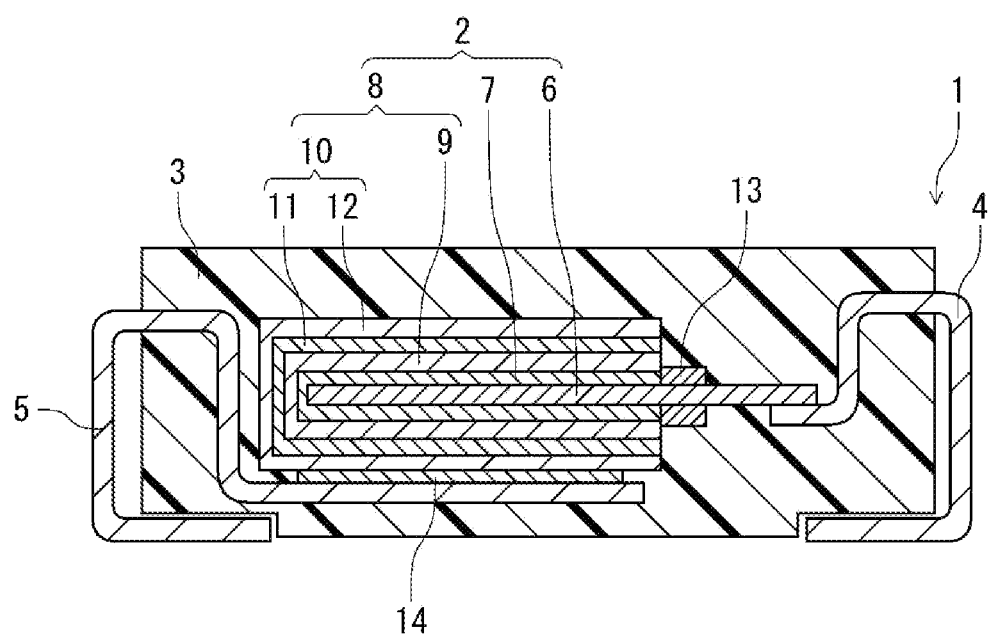

SOLID ELECTROLYTIC CAPACITOR ELEMENT AND SOLID ELECTROLYTIC CAPACITOR

TECHNICAL FIELD

The present disclosure relates to a solid electrolytic capacitor element and a solid electrolytic capacitor.

BACKGROUND

A solid electrolytic capacitor includes a solid electrolytic capacitor element, a resin exterior body or case that seals the solid electrolytic capacitor element, and an external electrode electrically connected with the solid electrolytic capacitor element. A solid electrolytic capacitor element includes an anode body, a dielectric layer disposed on the surface of the anode body, and a cathode part that covers at least a part of the dielectric layer. The cathode part includes a solid electrolyte layer and a cathode lead-out layer. The solid electrolyte layer covers at least a part of the dielectric layer and contains a conductive polymer. The cathode lead-out layer covers at least a part of the solid electrolyte layer.

Unexamined Japanese Patent Publication No. 2001-284182 proposes a solid electrolytic capacitor in which a cathode layer laminated on a solid electrolyte layer is formed of a carbon layer and a dielectric layer, and the carbon layer contains carbon particles and a benzene compound represented by a specific formula.

SUMMARY

A solid electrolytic capacitor element according to a first aspect of the present disclosure includes an anode body, a dielectric layer disposed on a surface of the anode body, a solid electrolyte layer covering at least a part of the dielectric layer, and a cathode lead-out layer covering at least a part of the solid electrolyte layer. The cathode lead-out layer includes a carbon layer that is in contact with the solid electrolyte layer and covers at least a part of the solid electrolyte layer. The carbon layer includes a carbonaceous material and a cyclodextrin compound. The cyclodextrin compound has a concentration of a saturated aqueous solution at 25° C. of 1.5 mass % or more.

A solid electrolytic capacitor according to another aspect of the present disclosure relates to a solid electrolytic capacitor including one or more solid electrolytic capacitor elements each being the solid electrolytic capacitor element described above.

According to the present disclosure, it is possible to suppress an increase in ESR when the solid electrolytic capacitor is exposed to high temperature.

BRIEF DESCRIPTION OF THE DRAWINGS

FIG. 1 is a schematic sectional view illustrating a solid electrolytic capacitor according to one exemplary embodiment of the present disclosure.

DESCRIPTION OF EMBODIMENT

Prior to the description of exemplary embodiments, a problem in the prior art will be briefly described below. In the solid electrolytic capacitor, when air enters the solid electrolytic capacitor, a conductive polymer is oxidized and degraded or a dopant contained in a solid electrolyte layer is decomposed by an action of moisture or oxygen contained in the air, so that the solid electrolyte layer is degraded, and conductivity of the solid electrolyte layer may be decreased. A decrease in conductivity of the solid electrolyte layer causes a decrease in performance of the solid electrolytic capacitor, such as an increase in ESR or a decrease in electrostatic capacitance of the solid electrolytic capacitor. Degradation of the solid electrolyte layer is remarkable particularly in a high-temperature environment. A solid electrolytic capacitor may be used in a high-temperature environment depending on use applications. Further, the solid electrolytic capacitor is generally joined using solder to the substrate through a reflow step that is exposed to high temperature. Thus, there is a demand for a solid electrolytic capacitor element and a solid electrolytic capacitor that suppress degradation of the solid electrolyte layer under a high-temperature environment and have excellent thermal stability.

When adhesion between the solid electrolyte layer and the carbon layer covering the surface of the solid electrolyte layer is low, air easily enters the solid electrolyte layer, so that the solid electrolyte layer is easily degraded, and ESR increases. When the adhesion between the solid electrolyte layer and the carbon layer is low, ESR also increases due to an increase in contact resistance.

When the solid electrolytic capacitor is exposed to high temperature, in a case where the carbon layer contains an organic additive agent, the additive agent volatilizes or decomposes, and ESR may greatly increase. This is considered to be because air easily enters the solid electrolyte layer due to formation of voids by volatilization or decomposition of the additive agent, and the solid electrolyte layer is easily degraded. Further, it is considered that the contact resistance between the solid electrolyte layer and the carbon layer increases due to the formation of voids, and conductivity of the carbon layer itself decreases due to cutting of a conductive path in the carbon layer, which is also a factor of the increase in ESR.

In view of the above, in the solid electrolytic capacitor element of the present disclosure, a cyclodextrin compound (hereinafter, referred to as a first cyclodextrin compound) having a concentration of a saturated aqueous solution at 25° C. of 1.5 mass % or more is used for the carbon layer together with the carbonaceous material. Such a carbon layer is formed, for example, by applying a liquid or paste aqueous dispersion containing a carbonaceous material and a first cyclodextrin compound to the solid electrolyte layer and drying the aqueous dispersion. In general, the surface of the solid electrolyte layer is difficult to uniformly wet with the aqueous dispersion due to high surface tension of water contained in the aqueous dispersion. According to the present disclosure, due to an action of the first cyclodextrin compound as a surfactant, the surface tension of the aqueous dispersion is reduced, and the surface of the solid electrolyte layer can be more uniformly wetted with the aqueous dispersion. As a result, adhesion between the formed carbon layer and the solid electrolyte layer can be enhanced, and initial ESR can be suppressed low. Moreover, the first cyclodextrin compound has high heat resistance due to its unique chemical structure. Hence, even when the solid electrolytic capacitor is exposed to high temperature, volatilization and decomposition, and formation of voids associated therewith can be suppressed. Thus, even when the solid electrolytic capacitor is exposed to high temperature, high adhesion between the solid electrolyte layer and the carbon layer can be maintained, and entering of air into the solid electrolyte layer can be suppressed, so that degradation of the solid electrolyte layer is suppressed. Furthermore, since formation of voids in the carbon layer is suppressed, high conductivity of the carbon layer is also maintained. Thus, it is possible to suppress an increase in ESR when the solid electrolytic capacitor is exposed to high temperature. As a result, thermal stability of the solid electrolytic capacitor element and the solid electrolytic capacitor is enhanced, so that reliability of the solid electrolytic capacitor element and the solid electrolytic capacitor element can be enhanced.

Hereinafter, the solid electrolytic capacitor and the solid electrolytic capacitor element (hereinafter, may be simply referred to as a capacitor element) of the present disclosure will be described more specifically with reference to the drawings as necessary.

[Solid Electrolytic Capacitor]

A solid electrolytic capacitor includes one or more capacitor elements. In at least one of the capacitor elements included in the solid electrolytic capacitor, the carbon layer may include the carbonaceous material and the first cyclodextrin compound. It is preferable that the carbon layer includes the carbonaceous material and the first cyclodextrin compound in 50% or more of the number of capacitor elements included in the solid electrolytic capacitor, it is more preferable that the carbon layer includes the carbonaceous material and the first cyclodextrin compound in 75% or more of the number of capacitor elements included in the solid electrolytic capacitor, and it is further preferable that the carbon layer includes the carbonaceous material and the first cyclodextrin compound in all capacitor elements.

(Capacitor Element)
(Anode Body)

The anode body may include a valve metal, an alloy containing the valve metal, a compound containing the valve metal, or the like. These materials can be used singly or in combination of two or more kinds thereof. As the valve metal, for example, aluminum, tantalum, niobium, and titanium are preferably used. The anode body having a porous surface can be obtained, for example, by roughening a surface of a base material (such as a foil-shaped or plate-shaped base material) containing the valve metal by etching or the like. The roughening can be performed by, for example, an etching treatment or the like. Further, the anode body may be a molded body of particles that contain a valve metal or a sintered body of the molded body. Note that the sintered body has a porous structure.

(Dielectric Layer)

The dielectric layer is an insulating layer that functions as a dielectric material formed so as to cover a surface of at least a part of the anode body. The dielectric layer is formed by anodizing the valve metal of the surface of the anode body by an anodizing treatment or the like. It is sufficient that the dielectric layer is formed so as to cover at least a part of the anode body. Usually, the dielectric layer is formed on the surface of the anode body. Since the dielectric layer is formed on the porous surface of the anode body, the dielectric layer is formed along an inner wall surface of a hole or a pit on the surface of the anode body.

The dielectric layer contains an oxide of a valve metal. For example, when tantalum is used as the valve metal, the dielectric layer contains $Ta_2O_5$, and when aluminum is used as the valve metal, the dielectric layer contains $Al_2O_3$. Note that the dielectric layer is not limited thereto, and any dielectric layer may be used as long as the dielectric layer functions as a dielectric material.

(Cathode Part)

The cathode part includes a solid electrolyte layer and cathode lead-out layers. The solid electrolyte layer covers at least part of the dielectric layer. The cathode lead-out layers cover at least part of the solid electrolyte layer. Usually, the cathode part is formed on at least a part of the surface of the anode body with the dielectric layer interposed between the cathode part and the cathode forming portion. Hereinafter, the solid electrolyte layer and the cathode lead-out layer will be described.

(Solid Electrolyte Layer)

The solid electrolyte layer is formed on the surface of the anode body so as to cover the dielectric layer with the dielectric layer interposed therebetween. The solid electrolyte layer does not necessarily cover the entire dielectric layer (the entire surface of the dielectric layer), and it is sufficient that the solid electrolyte layer may be formed so as to cover at least a part of the dielectric layer. The solid electrolyte layer constitutes at least a part of the cathode part in the solid electrolytic capacitor.

The solid electrolyte layer contains a conductive polymer. The solid electrolyte layer may further contain at least one of a dopant and an additive agent as necessary.

As the conductive polymer, there can be used, for example, a known polymer used for a solid electrolytic capacitor, such as a π-conjugated conductive polymer. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. Among these polymers, for example, it is preferable to use polymer that adopts polypyrrole, polythiophene or polyaniline as a basic skeleton. The above-mentioned polymer also includes a homopolymer, a copolymer of two or more kinds of monomers, and derivatives of these polymers (a substitute having a substituent group group). For example, polythiophene includes poly(3,4-ethylenedioxythiophene) and the like.

As the conductive polymer, one kind may be used alone, or two or more kinds may be used in combination.

A weight-average molecular weight (Mw) of the conductive polymer is not particularly limited, and is, for example, in a range from 1,000 to 1,000,000, inclusive.

Note that, in the present specification, the weight-average molecular weight (Mw) is a value in terms of polystyrene measured by gel permeation chromatography (GPC). Note that usually, GPC is measured using a polystyrene gel column, and water and methanol (volume ratio 8:2) that form a mobile phase.

The solid electrolyte layer can further contain a dopant. As the dopant, for example, at least one selected from the group consisting of an anion and a polyanion is used.

Examples of the anion include, but are not particularly limited to, a sulfate ion, a nitrate ion, a phosphate ion, a borate ion, an organic sulfonate ion, and a carboxylate ion. Examples of the dopant that generates sulfonate ions include benzenesulfonic acid, p-toluenesulfonic acid and naphthalenesulfonic acid.

As polyanion, for example, a polymer-type polysulfonic acid, and a polymer-type polycarboxylic acid and the like can be named. As the polymer-type polysulfonic acid, a polyvinylsulfonic acid, a polystyrenesulfonic acid, a polyallylsulfonic acid, a polyacrylsulfonic acid, a polymethacrylsulfonic acid and the like can be named. As the polymer-type polycarboxylic acid, a polyacrylic acid and a polymethacrylic acid can be named. The polyanion also includes a polyester sulfonic acid, a phenolsulfonic acid novolak resin and the like. However, the polyanion is not limited to such a kind.

The dopant may be contained in the solid electrolyte layer in a free form, in an anion form, or in a salt form, and may be contained in a form that the dopant is bonded to the conductive polymer or interacts with the conductive polymer.

A content ratio of the dopant in the solid electrolyte layer is, for example, in a range from 10 parts by mass to 1000 parts by mass, inclusive, and may be in a range from 20 parts by mass to 500 parts by mass, inclusive, or in a range from 50 parts by mass to 200 parts by mass, inclusive, with respect to 100 parts by mass of the conductive polymer.

The solid electrolyte layer may be a single layer or may be formed of a plurality of layers. When the solid electrolyte layer is formed of the plurality of layers, the conductive polymers contained in the layers may be the same or different. Further, the dopants included in the layers may be the same or different.

The solid electrolyte layer may further contain a known additive agent and a known conductive material other than the conductive polymer as necessary. Examples of such a conductive material include at least one selected from the group consisting of conductive inorganic materials such as manganese dioxide and TCNQ complex salts.

Note that a layer for improving adhesiveness may be interposed between the dielectric layer and the solid electrolyte layer.

The solid electrolyte layer is formed, for example, by polymerizing a precursor on the dielectric layer using a treatment liquid containing the precursor of the conductive polymer. The polymerization can be performed by at least one of chemical polymerization and electrolytic polymerization. Examples of the precursor of the conductive polymer include monomers, oligomers, prepolymers or the like. The solid electrolyte layer may be formed by attaching a treatment liquid (for example, a dispersion liquid or solution) containing a conductive polymer to the dielectric layer, and then drying the treatment liquid. Examples of the dispersion medium (or solvent) include water, an organic solvent, and a mixture thereof. The treatment liquid may further contain other components (at least one selected from the group consisting of a dopant and an additive agent, and the like).

When the treatment liquid containing the precursor of the conductive polymer is used, an oxidizing agent is used to polymerize the precursor. The oxidizing agent may be contained in the treatment liquid as an additive agent. Further, the oxidizing agent may be applied to the anode body before or after the treatment liquid is brought into contact with the anode body on which the dielectric layer is formed. Examples of such an oxidizing agent include a sulfate, a sulfonic acid, and a salt thereof. One kind of oxidizing agent can be used singly, or two or more kinds of oxidizing agents can be used in combination. As the sulfate, for example, a salt of a sulfuric acid such as ferric sulfate or sodium persulfate or a sulfuric acid group such as persulfuric acid and metal can be named. Examples of the metal constituting the salt include alkali metals (sodium, potassium, and the like), iron, copper, chromium, and zinc. The sulfonic acid or a salt of the sulfonic acid has a function as a dopant in addition to a function as the oxidizing agent. As the sulfonic acid or a salt of the sulfonic acid, a low molecular sulfonic acid or a salt of the low molecular sulfonic acid exemplified as the dopant can be used.

A step of forming the solid electrolyte layer by immersion in the treatment liquid and polymerization (or drying) may be performed once, or may be repeated a plurality of times. In each time, conditions such as the composition and viscosity of the treatment liquid may be the same, or at least one condition may be changed.

(Cathode Lead-Out Layer)

The cathode lead-out layer only needs to include at least a carbon layer that is in contact with the solid electrolyte layer and covers at least a part of the solid electrolyte layer, and may include a carbon layer and a metal-containing layer covering the carbon layer. Examples of the metal-containing layer include at least one selected from a layer containing metal powder and a metal foil. By providing the metal-containing layer, it is possible to ensure high conductivity of the cathode lead-out layer while ensuring higher heat resistance characteristics of the solid electrolyte layer.

(Carbon Layer)

The carbon layer includes a carbonaceous material and a first cyclodextrin compound. The carbon layer may include conductive particles (for example, metal powder) other than the carbonaceous material as necessary. When the cathode lead-out layer includes the metal-containing layer, the content of the metal powder in the carbon layer is usually smaller than the content of the metal in the metal-containing layer. The carbon layer may further include an aromatic compound having a sulfonic acid group. Also, the carbon layer may include an additive agent other than the first cyclodextrin compound and the aromatic compound having a sulfonic acid group.

As the carbonaceous material, a conductive carbonaceous material is usually used. Examples of the carbonaceous material include graphite (artificial graphite, natural graphite, vapor-grown carbon, and the like), carbon black, and amorphous carbon. The carbon layer may include one kind or two or more kinds of carbonaceous materials.

The first cyclodextrin compound may have a concentration of a saturated aqueous solution at 25° C. of 1.5 mass % or more. The first cyclodextrin compound may have a concentration of a saturated aqueous solution at 25° C. of 1.6 mass % or more or 2.5 mass % or more. It is preferable to use the first cyclodextrin compound having a concentration of a saturated aqueous solution at 25° C. of 5 mass % or more or 7.5 mass % or more (more preferably 10 mass % or more or 20 mass % or more). When water solubility of the first cyclodextrin compound is increased, the surface of the solid electrolyte layer can be more uniformly wetted with the aqueous dispersion for forming the carbon layer, and the adhesion between the solid electrolyte layer and the carbon layer can be further improved. Thus, initial ESR can be suppressed low, and the adhesion between the solid electrolyte layer and the carbon layer can be maintained even when the solid electrolytic capacitor is exposed to high temperature. The upper limit of the concentration of the saturated aqueous solution of the first cyclodextrin compound at 25° C. is not particularly limited, but may be, for example, 50 mass % or less.

A cyclodextrin compound is a cyclic oligosaccharide including a plurality of glucose units. The number of glucose units contained in one molecule of the first cyclodextrin compound is, for example, 5 or more, and may be 6 or more. The upper limit of the number of glucose units contained in one molecule of the first cyclodextrin compound is not particularly limited, and may be, for example, 10 or less, and may be 8 or less. These lower and upper limit values can be arbitrarily combined. Among the first cyclodextrin compounds, those having 6 or more and 8 or less glucose units are relatively easy to obtain or synthesize. Among the first cyclodextrin compounds, an α-cyclodextrin compound (the number of glucose units: 6), a β-cyclodextrin compound (the number of glucose units: 7), a γ-cyclodextrin compound (the number of glucose units: 8), and the like are preferable. Among them, the α-cyclodextrin compound and the γ-cyclodextrin compound (in particular, γ-cyclodextrin compounds) are more preferable because they have relatively high water solubility and are excellent in the effect of reducing the surface tension of the aqueous dispersion.

Examples of the first cyclodextrin compound include a cyclodextrin, a cyclodextrin having a substituent group, a compound in which at least a part of hydroxy groups of the cyclodextrin is modified with an organic group or the like, and a cyclodextrin having a substituent group and a hydroxy group modified with an organic group. As the substituent group and the organic group, those in which the concentration of the saturated aqueous solution of the first cyclodextrin compound at 25° C. is within the above range may be selected, and the type and introduction rate thereof are not particularly limited. For example, from the viewpoint of enhancing the water solubility of the first cyclodextrin compound, a hydrophilic substituent group or an organic group may be introduced into the first cyclodextrin compound. Further, from the viewpoint of adjusting balance between hydrophilicity and hydrophobicity of the first cyclodextrin compound, a hydrophobic substituent group or an organic group may be introduced into the first cyclodextrin compound, or a hydrophobic substituent group or an organic group and a hydrophilic substituent group or organic group may be introduced into the first cyclodextrin compound. Examples of the organic group include residues of saccharides (monosaccharides, polysaccharides, sugar alcohols, amino sugars, and the like), hydrocarbon groups (alkyl groups, aryl groups, and the like), hydroxyalkyl groups, aminoalkyl groups, alkoxy groups, acyl groups, and the like. Examples of the substituent group include hydrocarbon groups (alkyl groups, aryl groups, and the like), hydroxyalkyl groups, alkoxy groups, aminoalkyl groups, carboxy groups, acyloxy groups, acyl groups, alkoxycarbonyl groups, an oxo group (=O), halogen atoms, and the like. However, these organic groups and substituent groups are merely examples, and are not limited thereto.

The carbon layer may include one kind or two or more kinds of the first cyclodextrin compounds.

In the carbon layer, the content ratio of the first cyclodextrin compound is, for example, 4 parts by mass or more with respect to 100 parts by mass of the carbonaceous material. From the viewpoint of easily obtaining higher adhesion between the solid electrolyte layer and the carbon layer, the content ratio of the first cyclodextrin compound with respect to 100 parts by mass of the carbonaceous material is preferably 5 parts by mass or more, more preferably 10 parts by mass or more or 15 parts by mass or more, and may be 25 parts by mass or more or 30 parts by mass or more. The content ratio of the first cyclodextrin compound is, for example, 70 parts by mass or less with respect to 100 parts by mass of the carbonaceous material. From the viewpoint that the initial ESR can be suppressed low by ensuring high conductivity of the carbon layer, the content ratio of the first cyclodextrin compound with respect to 100 parts by mass of the carbonaceous material is preferably 65 parts by mass or less, and more preferably 60 parts by mass or less. These lower and upper limit values can be arbitrarily combined.

When the carbon layer contains an aromatic compound having a sulfonic acid group, the adhesion between the solid electrolyte layer and the carbon layer can be further enhanced. Further, since such an aromatic compound has the same action as the dopant, dedoping in the solid electrolyte layer can be reduced. Thus, when the carbon layer contains an aromatic compound having a sulfonic acid group, it is more advantageous from the viewpoint of suppressing initial ESR of the solid electrolytic capacitor low and from the viewpoint of suppressing an increase in ESR after exposure to high temperature.

Examples of the aromatic compound having a sulfonic acid group include aromatic sulfonic acids. The aromatic sulfonic acid may have at least one selected from the group consisting of a hydroxy group and a carboxy group in addition to a sulfonic acid group. The number of sulfonic acid groups in the aromatic sulfonic acid is 1 or more, and may be 2 or more. The number of sulfonic acid groups in the aromatic sulfonic acid may be, for example, 4 or less or 3 or less. These lower and upper limit values can be arbitrarily combined. The number of hydroxy groups and carboxy groups in the aromatic sulfonic acid may be 0, 1 to 4 or 1 to 3, or 1 or 2, respectively.

In the carbon layer, the aromatic compound having a sulfonic acid group may contain each of a sulfonic acid group and a carboxy group in a free form, in an anion form, in a salt form, or in a state of interacting with or binding to a component contained in the carbon layer. Also, in the carbon layer, the aromatic compound may contain a hydroxy group in a free form, in an anion form, or in a state of interacting with or binding to a component contained in the carbon layer.

The aromatic ring of the aromatic sulfonic acid may be a hydrocarbon ring or a heterocyclic ring. The number of carbon atoms of the aromatic ring is, for example, from 5 to 20 inclusive, may be from 6 to 20 inclusive or from 6 to 14 inclusive, or may be from 6 to 10 inclusive. The aromatic ring of the aromatic sulfonic acid may be fused with a non-aromatic hydrocarbon ring or heterocyclic ring.

The aromatic compound also includes those having a substituent group other than a sulfonic acid group, a hydroxy group, and a carboxy group. Examples of the substituent group include hydrocarbon groups (alkyl groups, aryl groups, and the like), hydroxyalkyl groups, alkoxy groups, an oxo group (=O), and halogen atoms, but are not limited thereto. The number of substituent groups is also not particularly limited, and may be 1 or more, or 2 or more. The number of substituent groups may be, for example, 4 or less.

Examples of such an aromatic sulfonic acid include, but are not limited to, benzenesulfonic acid, p-toluenesulfonic acid, naphthalenesulfonic acid, butylnaphthalenesulfonic acid, phenolsulfonic acid, sulfosalicylic acid, hydroquinone sulfonic acid, hydroquinone disulfonic acid, catechol sulfonic acid, catechol disulfonic acid, pyrogallol sulfonic acid, pyrogallol disulfonic acid, or salts thereof (for example, alkali metal salts (sodium salt, potassium salt, and the like)).

The aromatic compound having a sulfonic acid group also includes a condensation product of an aromatic sulfonic acid with an aldehyde compound (such as formaldehyde or a multimer thereof (such as trioxane)). As the aromatic sulfonic acid, for example, the above description can be referred to. Specific examples of such a condensation product include a phenol sulfonic acid formaldehyde condensation product, a naphthalene sulfonic acid formaldehyde condensation product, an aryl phenol sulfonic acid formaldehyde condensation product, an anthraquinone sulfonic acid formaldehyde condensation product, or salts thereof (for example, alkali metal salts (such as sodium salt and potassium salt)), but are not limited thereto.

The carbon layer may include one kind or two or more kinds of aromatic compounds having a sulfonic acid group.

In the carbon layer, the content ratio of the aromatic compound having a sulfonic acid group is, for example, 4 parts by mass or more with respect to 100 parts by mass of the carbonaceous material. From the viewpoint of easily obtaining higher adhesion between the solid electrolyte layer and the carbon layer, the content ratio of the aromatic compound having a sulfonic acid group with respect to 100 parts by mass of the carbonaceous material is preferably 5 parts by mass or more, more preferably 10 parts by mass or more or 15 parts by mass or more, and may be 25 parts by mass or more or 30 parts by mass or more. The content ratio of the aromatic compound having a sulfonic acid group is, for example, 300 parts by mass or less and may be 200 parts by mass or less with respect to 100 parts by mass of the carbonaceous material. From the viewpoint that the initial ESR can be suppressed low by ensuring high conductivity of the carbon layer, the content ratio of the aromatic compound having a sulfonic acid group with respect to 100 parts by mass of the carbonaceous material is preferably 150 parts by mass or less. These lower and upper limit values can be arbitrarily combined.

When the content ratios of the first cyclodextrin compound and the aromatic compound having a sulfonic acid group are determined from the carbon layer of the solid electrolytic capacitor element, the content ratios can be determined by the following procedure.

The solid electrolytic capacitor is disassembled, the capacitor element is taken out, and the surface layer is scraped to expose the carbon layer. A predetermined amount of sample (sample A) is collected by scraping the carbon layer, and the mass ($m_0$) is measured. Sample A is added to 5 mL of ion-exchanged water and the resulting mixture is boiled for 5 minutes. Subsequently, the mixture is separated into a solid and a liquid by centrifugation. The solid is washed with water and dried, and mass ($m_C$) of the dried product is measured. The mass $m_C$ is defined as the mass of the carbonaceous material contained in sample A.

Using the separated liquid as a sample for analysis (sample B), concentration $C_D$ of the first cyclodextrin compound and concentration $C_A$ of the aromatic compound having a sulfonic acid group are determined by high performance liquid chromatography. High performance liquid chromatography (HPLC: High Performance Liquid Chromatography) can be performed, for example, under the following conditions. The concentrations $C_D$ and $C_A$ are determined, for example, by an absolute calibration curve method.

(1) Conditions for HPLC Analysis of First Cyclodextrin Compound
Column: Shodex Asahipak NH2P-50 4E, manufactured by Showa Denko K.K.
Eluent: acetonitrile/water=60/40 (volume ratio)
Flow rate: 1.0 mL/min
Detector: Shodex RI, manufactured by Showa Denko K.K.
Column temperature: 40° C.

(2) HPLC Analysis Conditions of Aromatic Compound Having Sulfonic Acid Group
Column: Shodex Asahipak GF-310 HQ, manufactured by Showa Denko K.K.
Eluent: aqueous sodium chloride solution (concentration 50 mmol·$L^{-1}$)/acetonitrile=40/60 (volume ratio)
Flow rate: 0.6 mL/min
Detector: ultraviolet detector (wavelength: 220 nm)
Column temperature: 40° C.

From the mass $m_0$ and each of the concentrations $C_D$ and $C_A$, the mass $m_D$ of the first cyclodextrin compound contained in the sample A and the mass $m_A$ of the aromatic compound having a sulfonic acid group are determined. From these masses $m_D$ and $m_A$ and the mass $m_C$ of the carbonaceous material, each of the content ratios of the first cyclodextrin compound and the aromatic compound having a sulfonic acid group with respect to 100 parts by mass of the carbonaceous material contained in the carbon layer is determined.

When the kind of the first cyclodextrin compound and the aromatic compound having a sulfonic acid group contained in sample A is unknown, the first cyclodextrin compound and the aromatic compound having a sulfonic acid group are identified using sample B and at least one selected from the group consisting of mass spectrometry and optical spectroscopy.

The carbon layer may contain an additive agent other than the first cyclodextrin compound and the aromatic compound having a sulfonic acid group. Examples of such other additive agent include a cyclodextrin compound other than the first cyclodextrin compound (also referred to as a second cyclodextrin compound), an aromatic compound other than an aromatic compound having a sulfonic acid group (also referred to as a first aromatic compound) (also referred to as a second aromatic compound), a thickener, a surface conditioner, a surfactant, and the like. The carbon layer may include one kind or two or more kinds of such other additive agents. From the viewpoint of ensuring higher adhesion between the solid electrolyte layer and the carbon layer, the content ratios of the second cyclodextrin compound and the second aromatic compound are, for example, 5 parts by mass or less, and preferably 1 part by mass or less with respect to 100 parts by mass of the carbonaceous material.

A thickness of the carbon layer is, for example, in a range from 0.1 μm to 100 μm, inclusive, may be in a range from 0.5 μm to 50 μm, inclusive, or may be in a range from 1 μm to 20 μm, inclusive.

The carbon layer is formed using, for example, an aqueous dispersion containing constituent components (specifically, a carbonaceous material, a first cyclodextrin compound, an aromatic compound having a sulfonic acid group as necessary, and other additive agents as necessary) of the carbon layer. More specifically, the carbon layer can be formed by immersing an anode body having a dielectric layer on which the solid electrolyte layer is formed in an aqueous dispersion, applying a paste aqueous dispersion to a surface of the solid electrolyte layer, and drying the dispersion. As the aqueous dispersion, for example, one obtained by dispersing the above constituent components in an aqueous liquid medium (water, a mixture of water and a water-soluble organic medium, or the like) is used.

(Metal-Containing Layer)

Among the metal-containing layers, the layer containing metal powder can be formed, for example, by laminating a composition containing metal powder on a surface of the carbon layer. As such a metal-containing layer, for example, a metal paste layer formed using a composition containing metal powder such as silver particles and a resin (binder resin) can be used. As the resin, although a thermoplastic resin can be used, a thermosetting resin such as an imide resin or an epoxy resin is preferably used.

Among the metal-containing layers, a type of the metal that constitutes the metal foil is not particularly limited, but it is preferred to use a valve metal such as aluminum, tantalum, or niobium, or an alloy containing a valve metal. If necessary, a surface of the metal foil may be roughened by etching treatment or the like. On the surface of the metal foil may be provided an anodization film, a film of a metal (different type of metal) different from the metal that constitutes the metal foil, or a nonmetal film. Examples of the different type of metal include metals such as titanium.

Examples of the nonmetal material include carbon (conductive carbonaceous material or the like) and the like.

A thickness of the metal-containing layer is, for example, in a range from 0.1 μm to 100 μm, inclusive, may be in a range from 0.5 μm to 50 μm, inclusive, or may be in a range from 1 μm to 20 μm, inclusive.

(Others)

The solid electrolytic capacitor may be a wound type, or may be either a chip type or a stacked type. For example, the solid electrolytic capacitor may include a stack body of two or more capacitor elements. The configuration of the capacitor element may be selected in accordance with the type of the solid electrolytic capacitor.

In the capacitor element, one end part of the cathode terminal is electrically connected to the cathode lead-out layer. For example, a conductive adhesive is applied to the cathode layer, and the cathode terminal is bonded to the cathode layer via the conductive adhesive. One end part of the anode terminal is electrically connected to the anode body. The other end part of the anode terminal and the other end part of the cathode terminal are drawn out from a resin exterior body or a case. The other end part of each terminal exposed from the resin exterior body or the case is used for, for example, solder connection to a substrate on which the solid electrolytic capacitor is to be mounted.

The capacitor element is sealed using the resin exterior body or a case. For example, a material resin (for example, uncured thermosetting resins and fillers) of the capacitor element and the exterior body may be housed in a mold, and the capacitor element may be sealed with the resin exterior body by a transfer molding method, a compression molding method, or the like. At this time, a part on the other end part side of each of the anode terminal and the cathode terminal connected to the anode lead drawn out from the capacitor element is exposed from the mold. Further, the solid electrolytic capacitor may be formed by housing the capacitor element in a bottomed case such that a part on the other end part side of each of the anode terminal and the cathode terminal is positioned on an opening side of the bottomed case, and sealing the opening of the bottomed case with a sealing body.

FIG. 1 is a cross-sectional view schematically showing a structure of a solid electrolytic capacitor according to a first exemplary embodiment of the present disclosure. As illustrated in FIG. 1, solid electrolytic capacitor 1 includes capacitor element 2, resin exterior body 3 that seals capacitor element 2, and anode terminal 4 and cathode terminal 5 that are each at least partially exposed to an outside of resin exterior body 3. Anode terminal 4 and cathode terminal 5 can be made of metal such as copper or a copper alloy. Resin exterior body 3 has a substantially rectangular parallelepiped outer shape, and solid electrolytic capacitor 1 also has a substantially rectangular parallelepiped outer shape.

Capacitor element 2 includes anode body 6, dielectric layer 7 covering anode body 6, and cathode body 8 covering dielectric layer 7. Cathode body 8 includes solid electrolyte layer 9 covering dielectric layer 7, and cathode lead-out layer 10 covering solid electrolyte layer 9, and constitutes the cathode part described above. In the illustrated example, cathode lead-out layer 10 includes carbon layer 11, and metal paste layer 12 as a metal-containing layer. According to the present disclosure, carbon layer 11 includes a carbonaceous material and a first cyclodextrin compound. With such a configuration, adhesion between solid electrolyte layer 9 and carbon layer 11 can be improved, and capacitor element 2 and solid electrolytic capacitor 1 exhibit high thermal stability, so that an increase in ESR when exposed to high temperature is suppressed.

Anode body 6 includes a region facing cathode body 8, and a region not facing cathode body 8. In a region of anode body 6 that does not face cathode body 8, insulating separation layer 13 is formed in a part adjacent to cathode body 8 so as to cover a surface of anode body 6 in a band shape, and contact between cathode body 8 and anode body 6 is restricted. In the region of anode body 6 that does not face cathode body 8, another part is electrically connected to anode terminal 4 by welding. Cathode terminal 5 is electrically connected to cathode body 8 via adhesive layer 14 formed of a conductive adhesive.

EXAMPLES

Hereinafter, the present invention is specifically described with reference to Examples and Comparative Examples, but the present invention is not limited to the following Examples.

<<Solid Electrolytic Capacitors E1 to E12 and C1 to C2>>

Electrolytic capacitors 1 (solid electrolytic capacitors E1 to E12 and C1 to C2) illustrated in FIG. 1 were prepared in the following manner, and their characteristics were evaluated.

(1) Preparation of Anode Body 6

Both surfaces of an aluminum foil (thickness: 100 μm) as a base material were roughened by etching to prepare anode body 6.

(2) Formation of Dielectric Layer 7

A part on the other end part side of anode body 6 was immersed in an anodizing solution, and a DC voltage of 70 V was applied for 20 minutes to form dielectric layer 7 containing aluminum oxide.

(3) Formation of Solid Electrolyte Layer 9

An aqueous solution containing a pyrrole monomer and p-toluenesulfonic acid was prepared. A monomer concentration in this aqueous solution was 0.5 mol/L, and a concentration of p-toluenesulfonic acid was 0.3 mol/L.

Anode body 6 on which dielectric layer 7 was formed in the above (2) and a counter electrode were immersed in the obtained aqueous solution, and electrolytic polymerization was performed at a polymerization voltage of 3 V (polymerization potential with respect to a silver reference electrode) at 25° C. to form solid electrolyte layer 9.

(4) Formation of Cathode Body 8

Graphite particles as a carbonaceous material and, if necessary, additive agents shown in Table 1 were added to water at a mass ratio shown in Table 1, and the mixture was stirred to prepare a dispersion liquid. Anode body 6 on which solid electrolyte layer 9 obtained in the above (3) was formed was immersed in the dispersion liquid, taken out from the dispersion liquid, and then dried to form carbon layer 11 at least on the surface of solid electrolyte layer 9. Drying was carried out at a temperature ranging from 150° C. to 200° C. for 10 minutes to 30 minutes.

As Additive agent 2, a sodium phenolsulfonate formaldehyde condensation product was used. The concentration of the saturated aqueous solution of α-cyclodextrin used as Additive agent 1 at 25° C. was 11.8 mass % or more and less than 13.0 mass %. The concentration of the saturated aqueous solution of β-cyclodextrin at 25° C. was 1.7 mass % or more and less than 1.9 mass %. The concentration of the saturated aqueous solution of γ-cyclodextrin at 25° C. was 27.0 mass % or more and less than 30.0 mass %.

Next, a silver paste containing silver particles and a binder resin (epoxy resin) was applied onto the surface of carbon layer 11, and heated at 150° C. to 200° C. for 10 minutes to 60 minutes to cure the binder resin, thereby forming metal paste layer 12. Cathode body 8 composed of carbon layer 11 and metal paste layer 12 was thus formed.

Capacitor element 2 was produced as described above.

(5) Assembly of Solid Electrolytic Capacitor 1

Cathode body 8 of capacitor element 2 obtained in the above (4) was bonded to one end part of cathode terminal 5 with adhesive layer 14 of a conductive adhesive. One end part of anode body 6 protruding from capacitor element 2 and one end part of anode terminal 4 were joined by laser welding.

Subsequently, resin exterior body 3 made of an insulating resin was formed around capacitor element 2 by molding. At this time, the other end part of anode terminal 4 and the other end part of cathode terminal 5 were drawn out from resin exterior body 3.

Thus, a solid electrolytic capacitor was completed. In the same manner as described above, 20 pieces of solid electrolytic capacitors in total were prepared.

(6) Evaluation

The initial ESR and the ratio of change in ESR were evaluated by the following procedure using a solid electrolytic capacitor.

The initial ESR (mΩ) of each solid electrolytic capacitor at a frequency of 100 kHz were measured using an LCR meter for 4-terminal measurement under an environment of 20° C. Then, an average value (initial ESR: r0) of the 20 pieces of solid electrolytic capacitors was obtained.

Subsequently, the solid electrolytic capacitor was subjected to reflow treatment for 3 minutes in an environment of 260° C. After the reflow treatment, a test was performed by applying a rated voltage to the solid electrolytic capacitor for 162 hours under an environment of 125° C. Thereafter, ESR was measured in an environment at 20° C. in the same procedure as in the initial ESR, and an average value (ESR after test: r1) of the 20 pieces of solid electrolytic capacitors was obtained. The change (=r1-r0) in ESR by the test was determined, and a ratio (%) of the change in ESR when the average value of the initial ESR r0 was taken as 100% was calculated as an ESR change rate (ΔESR).

Results of the ratio of the change in ESR and the initial ESR (r0) are shown in Table 1.

TABLE 1

| | Carbonaceous material (parts by mass) | Additive agent 1 Type | Additive agent 1 (parts by mass) | Additive agent 2 (parts by mass) | ΔESR (%) | Initial ESR (mΩ) |
|---|---|---|---|---|---|---|
| E1 | 100 | γ-cyclodextrin | 4 | 0 | 1303 | 8.51 |
| E2 | 100 | α-cyclodextrin | 15 | 0 | 237 | 9.05 |
| E3 | 100 | α-cyclodextrin | 30 | 0 | 85 | 9.43 |
| E4 | 100 | α-cyclodextrin | 65 | 0 | 26 | 13.92 |
| E5 | 100 | β-cyclodextrin | 15 | 0 | 463 | 8.75 |
| E6 | 100 | β-cyclodextrin | 30 | 0 | 272 | 9.06 |
| E7 | 100 | γ-cyclodextrin | 10 | 0 | 381 | 8.39 |
| E8 | 100 | γ-cyclodextrin | 15 | 0 | 237 | 8.53 |
| E9 | 100 | γ-cyclodextrin | 30 | 0 | 81 | 8.97 |
| E10 | 100 | γ-cyclodextrin | 60 | 0 | 34 | 9.21 |
| E11 | 100 | γ-cyclodextrin | 65 | 0 | 29 | 10.39 |
| E12 | 100 | γ-cyclodextrin | 30 | 100 | 47 | 9.12 |
| C1 | 100 | — | 0 | 0 | 2349 | 8.28 |
| C2 | 100 | Pyrogallol | 50 | 0 | 1578 | 8.45 |

The present disclosure provides a solid electrolytic capacitor element and a solid electrolytic capacitor excellent in thermal stability. Thus, the solid electrolytic capacitor element and the solid electrolytic capacitor can be used for various applications in which high reliability is required.

The invention claimed is:

1. A solid electrolytic capacitor element comprising:
   an anode body;
   a dielectric layer disposed on a surface of the anode body;
   a solid electrolyte layer covering at least a part of the dielectric layer; and
   a cathode lead-out layer covering at least a part of the solid electrolyte layer,
   wherein:
     the cathode lead-out layer includes a carbon layer, the carbon layer being in contact with the solid electrolyte layer and covering at least a part of the solid electrolyte layer, and
     the carbon layer includes a carbonaceous material and a cyclodextrin compound, the cyclodextrin compound having a concentration of a saturated aqueous solution at 25° C. of 1.5 mass % or more.

2. The solid electrolytic capacitor element according to claim 1, wherein the cyclodextrin compound has a concentration of a saturated aqueous solution at 25° C. of 5 mass % or more.

3. The solid electrolytic capacitor element according to claim 1, wherein the cyclodextrin compound includes at least one selected from the group consisting of an α-cyclodextrin compound, a β-cyclodextrin compound, and a γ-cyclodextrin compound.

4. The solid electrolytic capacitor element according to claim 1, wherein in the carbon layer, a content ratio of the cyclodextrin compound is in a range from 5 parts by mass to 60 parts by mass, inclusive, with respect to 100 parts by mass of the carbonaceous material.

5. The solid electrolytic capacitor element according to claim 1, wherein the carbon layer further includes an aromatic compound having a sulfonic acid group.

6. The solid electrolytic capacitor element according to claim 1, wherein the cathode lead-out layer includes the carbon layer and a metal-containing layer covering at least a part of the carbon layer, and
   the metal-containing layer contains at least one selected from the group consisting of a metal foil and a layer containing metal powder.

7. A solid electrolytic capacitor comprising one or more solid electrolytic capacitor elements each being the solid electrolytic capacitor element according to claim 1.

* * * * *